United States Patent [19]
Ranganath et al.

[11] Patent Number: 5,119,450
[45] Date of Patent: Jun. 2, 1992

[54] BROAD WAVELENGTH RANGE SINGLE MODE INTEGRATED OPTICS DEVICE

[75] Inventors: Tirumala R. Ranganath, Palo Alto; David W. Dolfi, Los Altos, both of Calif.

[73] Assignee: Hewlett-Packard Company, Palo Alto, Calif.

[21] Appl. No.: 747,763

[22] Filed: Aug. 20, 1991

[51] Int. Cl.⁵ .................................. G02B 6/12
[52] U.S. Cl. ......................... 385/14; 385/11; 385/27
[58] Field of Search ............ 350/96.11, 96.12, 96.13, 350/96.15; 385/11, 14, 27, 4

[56] References Cited

U.S. PATENT DOCUMENTS 4,728,167  3/1988  Soref et al. ............. 350/96.15 X
4,776,657  10/1988  Reeder .................. 350/96.13 X
4,991,926  2/1991  Pavlath ................. 350/96.12 X
5,002,353  3/1991  Johnson ................. 350/96.12 X Primary Examiner—Akm E. Ullah
Assistant Examiner—Stephen W. Barns

[57] ABSTRACT

An optical circuit element for processing single mode light. The element is of the type that includes input and output waveguides that communicate with an intermediate waveguide network. The input and output waveguides are designed to support only the fundamental mode of light throughout a predetermined optical wavelength range while the waveguides of the intermediate waveguide network can support higher order modes. By maintaining adiabatic optical path transitions throughout the element, cross-coupling between the fundamental and higher order modes is avoided so that broad wavelength range single mode signal processing is achieved.

16 Claims, 2 Drawing Sheets

BROAD WAVELENGTH RANGE SINGLE MODE INTEGRATED OPTICS DEVICE

BACKGROUND

1. Field of the Invention

The present invention relates to elements for use in fiber optic-based systems of the type that are limited to lowest order optical mode transmission. More particularly, this invention pertains to improvements in such elements that result in operation over a broad wavelength range.

2. Description of the Prior Art

Numerous optical systems rely exclusively upon the transmission of single or lowest order mode light. For example, long distance fiber optic communication systems utilize single mode fiber to economize by increasing the distances between, and, thus, minimizing the number of, repeaters. Single mode fiber can maintain the character of transmitted signals over greater distances by offering larger bandwidths than multimode fiber.

In the past, optical signals of single mode systems have been processed by integrated optical devices, such as the Mach-Zehnder amplitude modulator of FIG. 1, that employ an exclusively single-mode design criterion in which all waveguides are capable of supporting only the fundamental mode. This has been believed necessary to avoid problems related to extinction (on/off) ratio, spatial uncertainty and the like. If one were to attempt to design an amplitude modulator of the Mach-Zehnder variety for operation from 1300 nm to 1550 nm, a very important wavelength band, using a conventional device optimized for 1300 nm operation, the weaker waveguide confinement at the longer wavelength would give rise to increased bend losses as well as require a higher drive voltage. Alternatively, using a 1550 nm optimized device at 1300 nm, one would expect to find a very poor extinction ratio as a consequence of multiple modes at the shorter wavelength.

Analogous problems are associated with other optical waveguide devices. As a result, one is presently forced to employ circuit elements optimized for very narrow wavelength range of operation, limiting interchangeability between wavelengths of operation.

SUMMARY OF THE INVENTION

The present invention addresses and overcomes the shortcomings described above by providing, in a first aspect, a broadband single mode optical circuit element for use over a predetermined optical wavelength range. Such element includes an optical waveguide network. The network includes an input waveguide, an output waveguide and an intermediate waveguide network. The intermediate waveguide network is in optical communication with both the input and output waveguides, each being arranged to support only the fundamental mode throughout the predetermined range. The intermediate waveguide network includes at least one waveguide capable of supporting a plurality of light modes within the predetermined range and this network is arranged so that substantially no energy is coupled from the fundamental mode to higher order modes throughout the predetermined range.

In a second aspect, the invention provides a single mode fiber optic circuit for processing light of predetermined optical wavelength range. Such circuit includes a plurality of segments of single mode optical fiber. At least one optical circuit element is provided, generally in accordance with the preceding paragraph, that is adapted to receive a first optical signal and to produce a second optical signal. Means are provided for coupling an optical signal from a first fiber segment into an input waveguide and for coupling an optical signal from the output waveguide into a second fiber segment.

In a preferred embodiment, a Mach-Zehnder amplitude modulator is formed by an arrangement of titanium-doped surface diffusions on an $LiNbO_3$ substrate. The waveguides comprising the device are doped to an extent that would support multiple modes at the shorter wavelength of a preselected range of wavelengths. The input and output waveguides are of reduced widths to assure that only a single mode is supported at the shorter wavelengths. An intermediate waveguide network is of adiabatic design to prevent the energization of higher order modes therein. The single mode design of the input and output waveguides avoids the possible generation of unwanted modes in the output while the wider guides of the intermediate network minimize bend losses, enhance interaction with electrical fields and reduce crosstalk between adjacent waveguides.

The preceding and other features and advantages of the present invention will become more readily appreciated from the detailed description that follows. This description is accompanied by a set of drawing figures. Numerals of the drawing figures, corresponding to those of the written description, point to the various features of the invention. Like numerals refer to like features throughout both the written description and the drawing figures.

DETAILED DESCRIPTION

Figure 1:
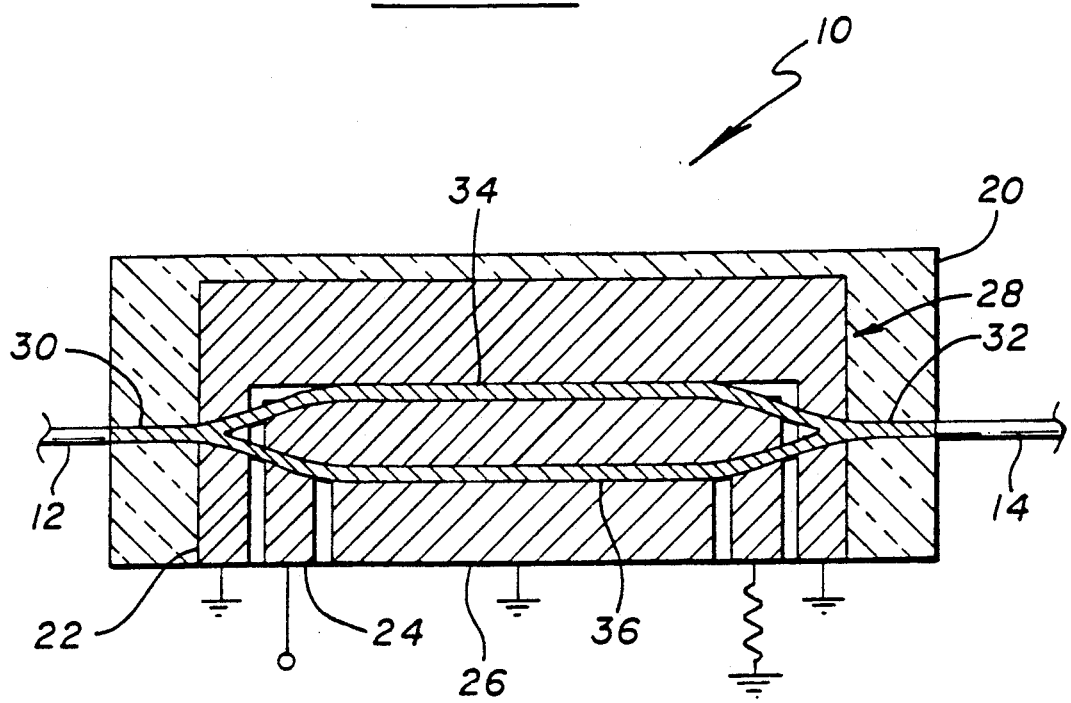
FIG. 1 is a top plan view of a Mach-Zehnder amplitude modulator in accordance with the prior art.

FIG. 1 is a top plan view of a portion of a fiber optic circuit in accordance with the prior art that includes a Mach-Zehnder amplitude modulator 10. Single mode optical systems and circuits often find advantageous uses due, in part, to the greater bandwidth of single mode, as opposed to multimode, optical fiber.

Light is transmitted through an input single mode optical fiber 12 and, after processing by the amplitude modulator 10, the modulated optical signal is delivered to a single mode output fiber 14. The input and output fibers 12 and 14 are optically and mechanically coupled to the modulator 10 by means of an appropriate optical cement.

The modulator 10 includes a substrate 20 of appropriate electro-optic material such as $LiNbO_2$. An electrode structure comprising metalizations 22, 24 and 26 is selectively deposited upon the top surface of the substrate 20 and situated with respect to a waveguide network 28 that includes straight input and output waveguides 30 and 32. The input and output waveguides communicate with parallel arm waveguides 34 and 36 that branch from fork or y-junctions to form a functioning device.

In operation, the electrodes 22, 24 and 26 are employed to impose electric fields to the waveguides 34 and 36 that control the relative speeds of propagation of the two light beams therethrough. Accordingly, these beams (resulting from the splitting of the input beam at the input y-junction) will be in-phase or out-of-phase by a controllable amount when combined at the output y-junction that communicates with the output waveguide 32. When out-of-phase, the antisymmetric mode (first higher order mode) is excited and leaks out of the output waveguide. Since the output waveguide 32 is designed to support and transmit only the fundamental mode, the intensity of the output of the modulator 10 will be reduced (from the input signal) to the extent that the antisymmetric mode is present.

Figure 2:
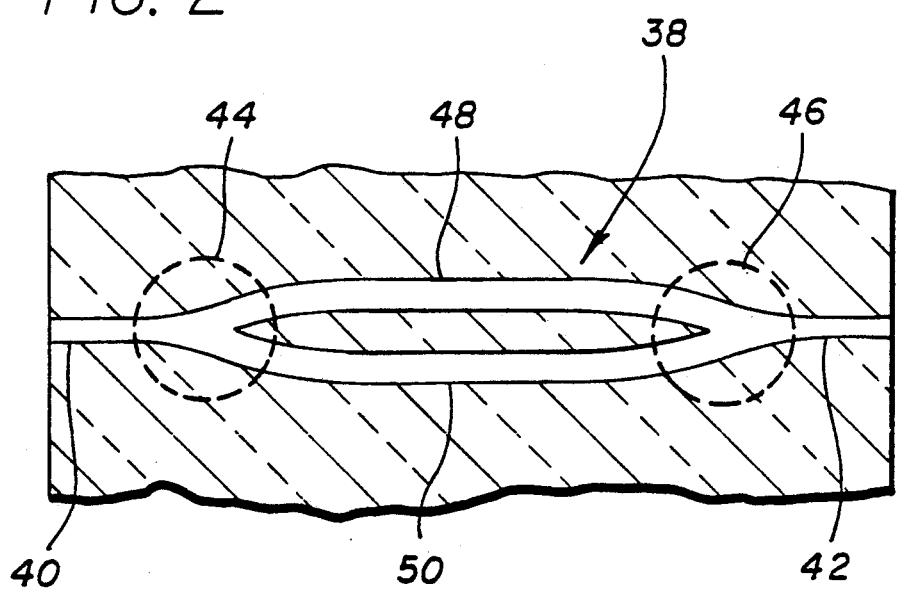
FIG. 2 is a top plan view of a Mach-Zehnder amplitude modulator in accordance with the invention with electrodes removed for purposes of clarity.

FIG. 2 is a top plan view of a Mach-Zehnder amplitude modulator in accordance with the invention with electrodes removed for purposes of clarity. The waveguide structure is illustrated without reference to its fabrication and the optical paths thereby existing in the device should not be considered to be limited to any particular waveguide technology. For example, the optical paths of the device 38 may comprise surface diffusions, strip-loaded or buried device structures.

As before, the waveguide 38 includes straight input and output sections 40 and 42 respectively. An input y-junction 44 and an output y-junction 46 serve to split the incoming light into a pair of parallel waveguide paths 48 and 50 and to recombine the two beams, after the application of appropriate modulation voltages, to form the modulated signal as described above.

In the prior art as shown in FIG. 1, all waveguide structures of the modulator 10 are designed to be capable of supporting only light of the fundamental mode and are incapable of supporting any higher-order modes. As explained, this conventional approach limits the wavelength range of operation of the device essentially to its center frequency. In the present invention, the inventors have adopted a new criterion to achieve significant broadening of the wavelength range of operation. The broad operation of the device is accomplished by (1) increasing the refractive index of the waveguide over that of a corresponding "conventional" waveguide designed for single mode operation at the longer wavelength (at the wider width) of a predetermined spectrum and (2) decreasing the widths of the input waveguide section 40 and the output section 42 below those of a conventional single mode device designed for operation at the shorter wavelength (at the lower index of refraction). The combination of these two principles is "fine tuned" so that the input waveguide 40 and the output waveguide 42 are capable of supporting only the fundamental mode throughout the predetermined optical wavelength range of interest.

Unlike the input and output sections, the waveguides of the intermediate waveguide network comprising the y-junctions 44 and 46 and the parallel arms 48 and 50 are not of reduced widths. Rather, the widths of the waveguides of the intermediate network are adequate for containment of the fundamental mode at the larger wavelength in a waveguide having a "conventional" index of refraction (as opposed to the increased index of the present invention.)

It is well known that the design of a structure such as a Mach-Zehnder amplitude modulator for operation over any appreciable wavelength range faces an inherent contradiction. A device optimized for operation at the shorter wavelength requires waveguides that are unable to guide the longer wavelength while one designed for the longer wavelength will excite higher-order modes at the shorter wavelength.

As discussed above, in the present invention the input waveguide 40 and the output waveguide 42 are designed to be capable of supporting only single mode light throughout the wavelength range of interest. This is accomplished, as mentioned above, by increasing the refractive index of the waveguide to assure containment of the longer wavelengths and decreasing the widths of these sections to prevent multi-mode operation at the shorter wavelengths.

The widths of the waveguides of the intermediate waveguide network 38 are not so limited. The inventors have found that, while the input and the output waveguides must be capable of supporting only the fundamental mode throughout the range of interest, conventional design techniques may be employed to assure that, although the waveguides of the intermediate network could support higher order modes at the shorter wavelengths, this does not, in fact, occur. The intermediate waveguide network of the device is carefully designed, by judicious selection of angles, symmetry, materials and the like so that the incoming optical energy does not in fact excite higher-order modes as it passes therethrough. The design of so-called "adiabatic" networks for maintaining the mode structure and for avoiding the energization of undesired (although potentially supportable) modes is well known and disclosed, for example, in D. Marcuse, Theory of Dielectric Optical Waveguides, Academic Press (1974) at pages 55 through 117. Thus, the optical energy from the input waveguide 40 essentially remains at the fundamental mode as it passes through the intermediate waveguide network 38. This feature of the design is, of course, most significant at the shorter wavelengths.

The existence of a positive relationship between waveguide dopant concentration and refractive index is well recognized in the art. See, for example, R. V. Schmidt and I. P. Kaminow, "Metal-Diffused Optical Waveguides in LiNbO$_3$," Applied Physics Letters, Vol. 25, No. 8 (Oct. 15, 1974). The dependence of the number of modes of light that can be supported or contained by a waveguide upon the refractive index differential, $\Delta n$, existing between the substrate and waveguide may be seen by examination of the so-called "V number" that characterizes a waveguide in integrated optics. This may be defined as follows:

$$V = (2\pi/\lambda)(hw)^{\frac{1}{2}}(2n\Delta n)^{\frac{1}{2}}$$

where:
n = refractive index of material surrounding waveguide;
$\Delta n$ = refractive index differential between waveguide and surrounding material;
$\lambda$ = wavelength of light propagating in waveguide;
h = height of waveguide; and
w = width of waveguide.
(Note: If the waveguide does not have a constant index of refraction and the height and width are not precisely defined (e.g. a diffused waveguide), a suitable average $\Delta n$, h and w can be defined.)

It can be shown that the number of modes N that the guide will support is:

$$N = cV^2 = (4\pi^2 c)(hw/\lambda^2)(2n\Delta n)$$

where:
c = a constant of order unity whose exact value is a function of details of the waveguide.

In order to maintain a single mode waveguide, the quantity $hwn\Delta n/\lambda^2$ must be a constant. Accordingly, an increase in the wavelength $\lambda$ must be compensated for the waveguide to remain single mode. It can be seen that either an increase in waveguide dimensions (h, w or both) or index difference ($\Delta n$) can counteract the effect of an increase in wavelength upon V, maintaining both that value and the number of modes (1 in the case of a single mode guide). Conversely, it will be appreciated that an increase in $\Delta n$ due to increased waveguide dopant concentration can be offset in the same sense by an increase in the wavelength of the single mode supported by the subject waveguide.

Figure 3A:
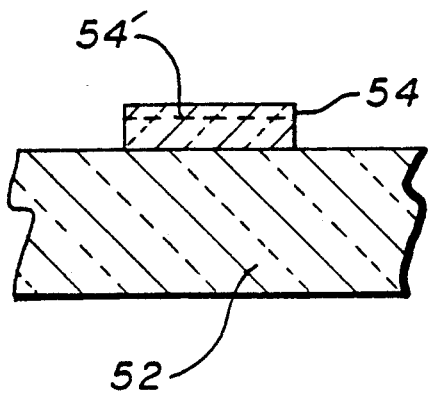
FIGS. 3(a) and 3(b) are cross-sectional views of surface diffusion waveguides in accordance with the invention, FIG. 3(a) representing an intermediate step in the formation of the waveguide illustrated in FIG. 3(b)
Figure 3B:
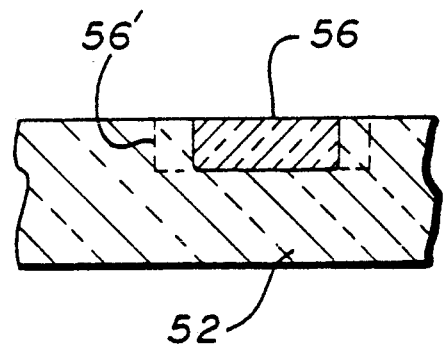
Figure 4:
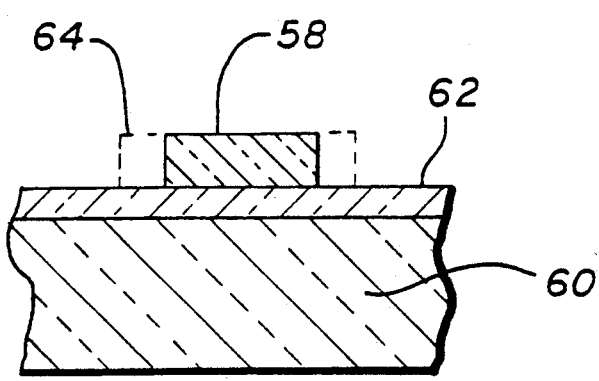
FIG. 4 is a cross-sectional view of a strip waveguide in accordance with the invention.
Figure 5:
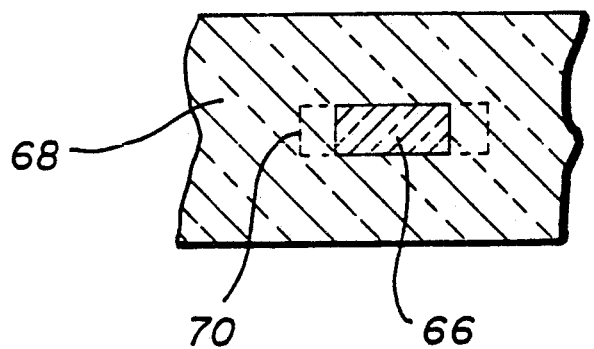
FIG. 5 is a cross-sectional view of a buried waveguide formed in accordance with the invention.

FIGS. 3 through 5 are cross-sectional views of waveguides adapted for use in a Mach-Zehnder amplitude modulator in accordance with the invention. Referring first to a diffused surface waveguide structure, FIG. 3(a) illustrates a substrate 52 of appropriate electro-optic material such as $LiNbO_3$ prior to diffusion of titanium (or equivalent) atoms from a metallic strip 54 of appropriate material which, in this case, is, of course, titanium. The strip 54 may be deposited onto the substrate 52 by any number of conventional processes such as electron beam evaporation or sputtering. The strip 54 for forming a waveguide in accordance with the invention is somewhat thicker than the strip 54' shown in shadow outline for forming a conventional waveguide. For example, in a conventional device optimized for operation at 1300 nm, a titanium strip 54 having a thickness of about 70 nm might be employed. In the present invention, a strip 54 of about 95 nm thickness is used to attain the greater concentration of atoms required to enhance the refractive index of the diffused waveguide. As mentioned earlier, increasing the concentration of diffused atoms increases the refractive index of the waveguide and permits it to support the longer wavelength light despite narrowing of the input and output waveguides.

FIG. 3(b) is a cross-sectional view of an input (or output) waveguide of a Mach-Zehnder amplitude modulator in accordance to the invention. The waveguide comprises a surface diffusion 56 of titanium atoms. Such diffusion 56 is produced by the conventional processing of the strip 54 discussed with reference to FIG. 3(a). Typically, the diffusion 56 is formed by baking the arrangement of FIG. 3(a) at a temperature of about 1050 degrees C. for about six (6) hours. The thickness of the strip 54, discussed above, enables one to produce a waveguide diffusion having an effective index of refraction about 2.17 as opposed to one of about 2.16 for a waveguide of a corresponding prior art device. (Note: The substrate 52 will have an index of refraction of about 2.15 for operation within the wavelength range discussed above.) As a result the longer wavelength can be guided in spite of reductions in widths of the input and output waveguide sections. A waveguide of the intermediate waveguide network is shown in shadow outline at 56'. The width of the waveguide 56' is the same as that of the input and output waveguides of a conventional Mach-Zehnder amplitude modulator for operation at the longer wavelengths of the spectrum covered by the present invention.

FIG. 4 is a cross-sectional view of an input or output waveguide in accordance with an alternative embodiment of the invention. Such a waveguide is fabricated with strip waveguide technology. In such a waveguide, an overlying strip 58 of dielectric material such as glass or silicon nitride is located at the surface of a substrate 60 that includes an upper, light guiding layer 62. The layer 62 may comprise an epitaxially-grown layer of InGaAsP formed on a substrate of InP.

The width of the waveguiding channel within the light guiding strip 62 is reduced (with respect to one for a prior art Mach-Zehnder modulator or for a waveguide of the intermediate network of the invention) at the input and output waveguides by reducing the width of the overlying dielectric strip 58. The bounds of a dielectric strip for either the intermediate waveguide network (or for any waveguide of the prior art device) is shown in shadow outline at 64. In the present invention, at the wavelength spectrum described above, a reduction in the width of the strip 58 from about 3 $\mu$m to 2 $\mu$m would be appropriate for preventing support of higher order modes at the shorter wavelength.

The refractive index of the light guiding layer 62 is increased in accordance with the invention by adjusting the chemical composition of the components of the InGaAsP system prior to epitaxial deposition. The adjustment of elemental factors results in a corresponding adjustment of the refractive index of the layer 62 as is well known by those skilled in the art. In a representative strip-loaded waveguide for operation at 1300 nm, representative indices of refraction in accordance with the prior art might be approximately as follows: 3.4 (strip 58); 3.5 (waveguiding layer 62); and 3.2 (substrate 60). By modifying the chemical composition of the epitaxial light guiding layer 62, the index of refraction of that layer is preferably increased to about 3.6 (the indices of the other layers remaining the same) to accomplish operation over a predetermined optical wavelength range in accordance with the invention.

FIG. 5 is a cross-sectional view of a buried waveguide (input or output section) in accordance with the present invention. A waveguide 66 is embedded in a substrate 68 of appropriate material such as $LiNbO_3$. The buried waveguide 66 is formed within the substrate 68 by means of a conventional titanium (Ti) diffusion process followed by a second diffusion of a different material such as magnesium dioxide ($MgO_2$). The waveguide is formed initially at the surface by means of the standard Ti diffusion process, which raises the index of refraction in the region of the Ti diffusion. A second diffusion of $MgO_2$ just at the surface lowers the index of refraction slightly to offset the effect of the first diffusion. If the second diffusion is shallower than the first, the deeper part of the Ti diffused guide is unaffected, resulting in a buried waveguide, as desired. As before, the dimensions of a buried waveguide 66 of a prior art device for operation at the longer wavelength or one for use in the intermediate waveguide network of the present invention is shown in shadow outline at 70.

The index of refraction of a substrate 68 for use within the wavelength range of interest is approximately 2.15, while that of the buried waveguide 70 of a prior art device is about 2.16. In the present invention, the index of of refraction of the buried waveguide 66 is increased to about 2.17. As in a surface waveguide, this can be accomplished by increasing the amount of titanium deposited on the surface of the substrate prior to the first diffusion.

Thus it can be seen that the present invention provides optical circuit elements for use in single mode fiber optic systems. By employing the teachings of this invention, one may enhance systems that have been limited in optical wavelength range as a result of formerly-inherent device design limitations. Accordingly, such systems are greatly enhanced in terms of cost and versatility. Furthermore, conventional design and fabrication methods may be employed to produce the enhanced devices.

While this invention has been described with reference to its presently preferred embodiment, it is not limited thereto. Rather, this invention is limited only insofar as defined by the following set of patent claims and includes within its scope all equivalents thereof.

What is claimed is:

1. A broadband single mode optical circuit element for use over a predetermined optical wavelength range comprising, in combination:
   a) an optical waveguide network;
   b) said network including an input waveguide, an output waveguide and an intermediate waveguide network;
   c) said intermediated waveguide network being in optical communication with said input waveguide and said output waveguide;
   d) said input waveguide and said output waveguide being arranged so they each can support only the fundamental mode of light over said predetermined range;
   e) said intermediate waveguide network including at least one waveguide capable of supporting a plurality of modes of light throughout its length within said predetermined range; and
   f) said waveguide network being arranged so that substantially no energy is coupled from said fundamental mode to higher order modes throughout said predetermined range.

2. A circuit element as defined in claim 1 further including a substrate, the optical waveguide being integral with said substrate.

3. A circuit element as defined in claim 2 further characterized in that the index of refraction of said waveguide is sufficient to support multiple modes within said intermediate waveguide network over said predetermined range.

4. A circuit element as defined in claim 3 wherein the widths of said input and output waveguides are chosen so that said waveguides can support only the fundamental mode within said predetermined range.

5. A circuit element as defined in claim 4 wherein said optical waveguide comprises diffused regions adjacent the surface of said substrate.

6. A circuit element as defined in claim 4 wherein said optical waveguide is a strip loaded waveguide.

7. A circuit element as defined in claim 4 wherein said optical waveguide is a buried waveguide.

8. A broadband single mode Mach Zehnder amplitude modulator for use over a predetermined optical wavelength range comprising, in combination:
   a) an optical waveguide network, said optical network being integral with a substrate and including an input waveguide, an output waveguide and an intermediate waveguide network;
   b) said intermediate waveguide network being in optical communication with said input waveguide and said output waveguide;
   c) the index of refraction of said waveguide being sufficient to support multiple modes within at least one waveguide of said intermediate waveguide network over said predetermined range;
   d) the widths of said input and output waveguides being chosen so that said waveguides can support only the fundamental mode within said predetermined range;
   e) said waveguide network being arranged so that substantially no energy is coupled from said fundamental mode to higher order modes throughout said predetermined range;
   f said intermediate waveguide network comprises a pair of oppositely-directed fork junctions joined by a parallel pair of straight waveguides;
   g each of said input waveguides comprises a straight waveguide segment that intersects the apex of one of said forks;
   h the waveguides of said intermediate waveguide network are substantially of a first width and those of said input and output waveguides are substantially of a second width; and
   i said first width is greater than said second width.

9. A single mode fiber optic circuit for processing light of a predetermined optical wavelength range comprising, in combination:
   a) a plurality of segments of single mode optical fiber;
   b) at least one optical circuit element adapted to receive a first optical signal and to produce a second optical signal;
   c) said element including an optical waveguide network having an input waveguide, an output waveguide and an intermediate waveguide network, said intermediate waveguide network being in optical communication with said input waveguide and said output waveguide;
   d) means for coupling an optical signal from a first fiber segment into said input waveguide;
   e) means for coupling an optical signal from said output waveguide into a second fiber segment;
   f) said input waveguide and said output waveguide being arranged so that each of such waveguides can support only the fundamental mode of light throughout said predetermined range;
   g) said intermediate waveguide network including at least one waveguide capable of supporting a plurality of modes of light throughout its length within said predetermined range; and
   h) said waveguide network being arranged so that substantially no energy is coupled from said fundamental mode to said higher order modes throughout said predetermined range.

10. A single mode fiber optic circuit as defined in claim 9 wherein said at least one optical circuit element further includes a substrate, and said optical waveguide is integral with said substrate.

11. A single mode fiber optic circuit as defined in claim 10 wherein said element is further characterized in that the index of refraction of said waveguide is sufficient to support multiple modes within said intermediate waveguide network over said predetermined range.

12. A single mode fiber optic circuit as defined in claim 11 wherein the widths of said input and output waveguides are chosen so that said waveguides can support only the fundamental mode over said predetermined range.

13. A single mode fiber optic circuit as defined in claim 12 wherein said optical waveguide comprises diffused regions adjacent the surface of said substrate.

14. A single mode fiber optic circuit as defined in claim 12 wherein said optical waveguide is a strip loaded waveguide.

15. A single mode fiber optic circuit as defined in claim 12 wherein said optical waveguide is a buried waveguide.

16. A single mode fiber optic circuit for processing light of a predetermined optical wavelength range comprising, in combination:
   a) a plurality of segments of single mode optical fiber;
   b) at least one Mach-Zehnder amplitude modulator adapted to receive a first optical signal and to produce a second optical signal;
   c) said element including an optical waveguide network integral with a substate, said network having an input waveguide, an output waveguide and an intermediate waveguide network, said intermediate waveguide network being in optical communication with said input waveguide and said output waveguide;
   d) means for coupling an optical signal from a first fiber segment into said input waveguide;
   e) means for coupling an optical signal from said output waveguide into a second fiber segment;
   f) the index of refraction of said waveguide being sufficient to support multiple modes within at least one waveguide of said intermediate waveguide network over said predetermined range;
   g) the widths of said input and output waveguides being chosen so that said waveguides can support only the fundamental mode over said predetermined range;
   h) said waveguide network being arranged so that substantially no energy is coupled from said fundamental mode to said higher order modes throughout said predetermined range;
   i said intermediate waveguide network comprising a pair of oppositely-directed fork junctions joined by a pair of straight waveguides;
   j each of said input waveguides comprising a straight waveguide segment that intersects the apex of one of said forks;
   k the waveguides of said intermediate waveguide network being substantially of a first width and those of said input and output waveguides being substantially of a second width; and
   l said first width is greater than said second width.

* * * * *